(12) United States Patent
Takahashi et al.

(10) Patent No.: US 11,280,991 B2
(45) Date of Patent: Mar. 22, 2022

(54) IMAGE ACQUISITION DEVICE AND IMAGE ACQUISITION METHOD (71) Applicant: HAMAMATSU PHOTONICS K.K., Hamamatsu (JP)

(72) Inventors: Akira Takahashi, Hamamatsu (JP); Takayuki Kawashima, Hamamatsu (JP); Jinichi Susuki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 210 days.

(21) Appl. No.: 16/637,543

(22) PCT Filed: May 28, 2018

(86) PCT No.: PCT/JP2018/020375
§ 371 (c)(1),
(2) Date: Feb. 7, 2020

(87) PCT Pub. No.: WO2019/044076
PCT Pub. Date: Mar. 7, 2019

(65) Prior Publication Data
US 2020/0257099 A1 Aug. 13, 2020

(30) Foreign Application Priority Data
Aug. 31, 2017 (JP) .............................. JP2017-167294

(51) Int. Cl.
*G02B 21/06* (2006.01)
*G02B 21/26* (2006.01)
*G02B 21/36* (2006.01)

(52) U.S. Cl.
CPC ............. *G02B 21/06* (2013.01); *G02B 21/26* (2013.01); *G02B 21/367* (2013.01)

(58) Field of Classification Search
CPC ...... G02B 21/06; G02B 21/26; G02B 21/367; G02B 21/00; G02B 21/0004;
(Continued)

(56) References Cited

U.S. PATENT DOCUMENTS

2002/0090127 A1* 7/2002 Wetzel ............... G02B 21/0016
382/133
2006/0034543 A1 2/2006 Bacus et al.
(Continued)

FOREIGN PATENT DOCUMENTS

CN 101952762 A 1/2011
CN 105683805 A 6/2016
(Continued)

OTHER PUBLICATIONS

International Preliminary Report on Patentability dated Mar. 12, 2020 for PCT/JP2018/020375.

*Primary Examiner* — Arnel C Lavarias
(74) *Attorney, Agent, or Firm* — Faegre Drinker Biddle & Reath LLP (57) ABSTRACT

In an image acquisition device, when capturing an optical image of a sample S through lane scanning, the number of tile images T included in a tile image row R acquired in one lane is counted, and a determination is made as to whether or not the number of images reaches a planned acquisition count that is set in advance. In a case where it is determined that the number of images does not reach the planned acquisition count, lane scanning with respect to the lane is re-executed. Accordingly, even when a loss of the tile images T occurs due to an environment load, the tile images T are complemented by re-execution of the lane scanning, and thus it is possible to prevent the loss of the tile images T in an observation image.

10 Claims, 9 Drawing Sheets (58) Field of Classification Search
CPC .............. G02B 21/002; G02B 21/0052; G02B 21/008; G02B 21/36; G02B 21/361; G02B 21/365
USPC ....... 359/385, 362, 363, 368, 369, 388, 389, 359/390
See application file for complete search history.

(56) References Cited

U.S. PATENT DOCUMENTS

2012/0078045 A1\* 3/2012 Sasaki .................. A61B 1/0002
600/109
2012/0127297 A1\* 5/2012 Baxi ...................... G06K 9/036
348/79
2013/0077892 A1 3/2013 Ikeno et al.

FOREIGN PATENT DOCUMENTS

| CN | 105683806 A | 6/2016 |
|---|---|---|
| JP | H11-264937 A | 9/1999 |
| JP | 2006-308337 A | 11/2006 |
| JP | 2015-087719 A | 5/2015 |
| JP | 2015-087723 A | 5/2015 |
| JP | 2016-125913 A | 7/2016 |
| JP | 2017-097229 A | 6/2017 |
| WO | WO 01/084209 A2 | 11/2001 |
| WO | WO 2015/174057 A1 | 11/2015 |
| WO | WO 2016/079853 A1 | 5/2016 |

\* cited by examiner

IMAGE ACQUISITION DEVICE AND IMAGE ACQUISITION METHOD

TECHNICAL FIELD

The present disclosure relates to an image acquisition device and an image acquisition method.

BACKGROUND ART

In an image acquisition device for acquiring a still image of a sample such as a tissue cell, in a case where the sample is greater than an image capturing visual field of an image capturing element, for example, partial images of the sample are sequentially acquired while moving a stage that holds the sample with respect to an objective lens, and then the partial images are composed to acquire an entire image of the sample. In the image acquisition device, for example, an image acquisition method called a tiling scanning method has been used. In the tiling scanning method, the stage is moved so that a predetermined region of the sample is included in a visual field of the objective lens, and tile images (partial images of the sample) are acquired by using a two-dimensional image capturing element such as an area sensor. Then, the same operation is repetitively executed to acquire an observation image (an entire image of the sample) including a plurality of tile image rows (for example, refer to Patent Literature 1 and Patent Literature 2).

CITATION LIST

Patent Literature

Patent Literature 1: Japanese Unexamined Patent Publication No. 2015-087723
Patent Literature 2: Japanese Unexamined Patent Publication No. 2015-087719

SUMMARY OF INVENTION

Technical Problem

In the image acquisition device that employs the tiling scanning method, a position of the stage that holds the sample is monitored by using a position detection unit such as a linear encoder, and capturing of an optical image of the sample is executed at timing at which the sample reaches a target position. However, when an environment load such as vibration, static electricity, and a temperature is applied to the image acquisition device from the outside during execution of scanning, it is considered that a malfunction occurs in the position detection unit. When the malfunction occurs in the position detection unit, there is a concern that the two-dimensional image capturing element skips image capturing at the target position, and tile images which constitute the observation image may be lost.

The present disclosure has been made to solve the problem, and an object thereof is to provide an image acquisition device and an image acquisition method which are capable of preventing loss of tile images in an observation image.

Solution to Problem

According to an aspect of the present disclosure, there is disclosed an image acquisition device including: a stage that holds a sample; a light emission unit that emits instantaneous light; a light guide optical system that includes an objective lens disposed to face the sample on the stage; a drive unit that moves the sample in a scanning direction intersecting an optical axis of the objective lens at a predetermined speed; a two-dimensional image capturing element that captures an optical image of the sample, which is guided by the light guide optical system, through lane scanning in cooperation with the light emission unit and the drive unit, and acquires observation image data constituted by a plurality of tile image rows; a control unit that controls execution of the lane scanning by the light emission unit, the drive unit, and the two-dimensional image capturing element; and a determination unit that counts the number of tile images included in each of the tile image rows which is acquired in one lane, and determines whether or not the number of images reaches a planned acquisition count that is set in advance. In a case where the determination unit determines that the number of images does not reach the planned acquisition count, the control unit re-executes the lane scanning with respect to the one lane.

In the image acquisition device, when capturing the optical image of the sample through the lane scanning, the number of the tile images included in the tile image row acquired in one lane is counted, and a determination is made as to whether or not the number of images reaches the planned acquisition count set in advance. In addition, in a case where it is determined that the number of images does not reach the planned acquisition count, the lane scanning with respect to the lane is re-executed. Accordingly, even when a loss of the tile images occurs due to an environment load, the tile images are complemented by re-execution of the lane scanning, and thus it is possible to prevent the loss of the tile images in an observation image.

In addition, when re-executing the lane scanning, the control unit may set a movement speed of the stage to a speed slower than the predetermined speed. According to this, it is possible to suppress occurrence of the loss of the tile images when re-executing the lane scanning.

In addition, the image acquisition device may further include a position detection unit that detects a position of the stage, and the control unit may synchronize image capturing by the two-dimensional image capturing element and emission of the instantaneous light by the light emission unit on the basis of position information of the stage which is generated by the position detection unit. According to this, it is possible to appropriately execute acquisition of the tile images at a target position of the sample.

In addition, the determination unit may count the number of the tile images included in the tile image row whenever image capturing in the one lane is completed. In this case, necessity and non-necessity of complementation of the tile images are determined at the time of acquiring each of the tile image rows, and thus it is possible to obtain an observation image without the loss of the tile images simultaneously with completion of the lane scanning.

In addition, the determination unit may count the number of the tile images included in each of the tile image rows after completing image capturing in all lanes. In this case, necessity and non-necessity of complementation of the tile images are determined after acquisition of all tile image rows, and thus in a case where the loss of the tile images does not occur, it is possible to shorten time taken until obtaining the observation image.

In addition, according to another aspect of the present disclosure, there is provided an image acquisition method including: an alignment step of aligning a stage that holds a sample with respect to an objective lens so that a visual field position of the objective lens is located at an initiation position of lane scanning; an image capturing step of capturing an optical image of the sample by a two-dimensional image capturing element in synchronization with irradiation of instantaneous light while moving the stage in a scanning direction of the lane scanning at a predetermined speed, and acquiring observation image data constituted by a plurality of tile image rows; a determination step of counting the number of tile images included in each of the tile image rows which is acquired in one lane, and determining whether or not the number of images reaches a planned acquisition count that is set in advance; and re-execution step of re-executing lane scanning with respect to the one lane in a case where it is determined that the number of images does not reach the planned acquisition count in the determination step.

In the image acquisition method, when capturing the optical image of the sample through the lane scanning, the number of the tile images included in the tile image row acquired in one lane is counted, and a determination is made as to whether or not the number of images reaches the planned acquisition count set in advance. In addition, in a case where it is determined that the number of images does not reach the planned acquisition count, the lane scanning with respect to the lane is re-executed. Accordingly, even when a loss of the tile images occurs due to an environment load, the tile images are complemented by re-execution of the lane scanning, and thus it is possible to prevent the loss of the tile images in an observation image.

In addition, in the re-execution step, a movement speed of the stage may be set to a speed slower than the predetermined speed. According to this, it is possible to suppress occurrence of the loss of the tile images during re-execution of the lane scanning.

In addition, the image acquisition method may further include a position detection step of detecting a position of the stage, and in the image capturing step, image capturing by the two-dimensional image capturing element and emission of the instantaneous light may be synchronized on the basis of position information of the stage which is generated in the position detection step. According to this, it is possible to appropriately execute acquisition of the tile images at a target position of the sample.

In addition, in the determination step, the number of the tile images included in the tile image row may be counted whenever image capturing in the one lane is completed. In this case, necessity and non-necessity of complementation of the tile images are determined at the time of acquiring each of the tile image rows, and thus it is possible to obtain an observation image without the loss of the tile images simultaneously with completion of the lane scanning.

In addition, in the determination step, the number of the tile images included in each of the tile image rows may be counted after completing image capturing in all lanes. In this case, necessity and non-necessity of complementation of the tile images are determined after acquisition of all tile image rows, and thus in a case where the loss of the tile images does not occur, it is possible to shorten time taken until obtaining the observation image.

Advantageous Effects of Invention

According to the image acquisition device and the image acquisition method, it is possible to prevent loss of tile images in an observation image.

DESCRIPTION OF EMBODIMENTS

Hereinafter, a preferred embodiment of an image acquisition device and an image acquisition method according to an aspect of the present disclosure will be described in detail with reference to the accompanying drawings.

Figure 1:
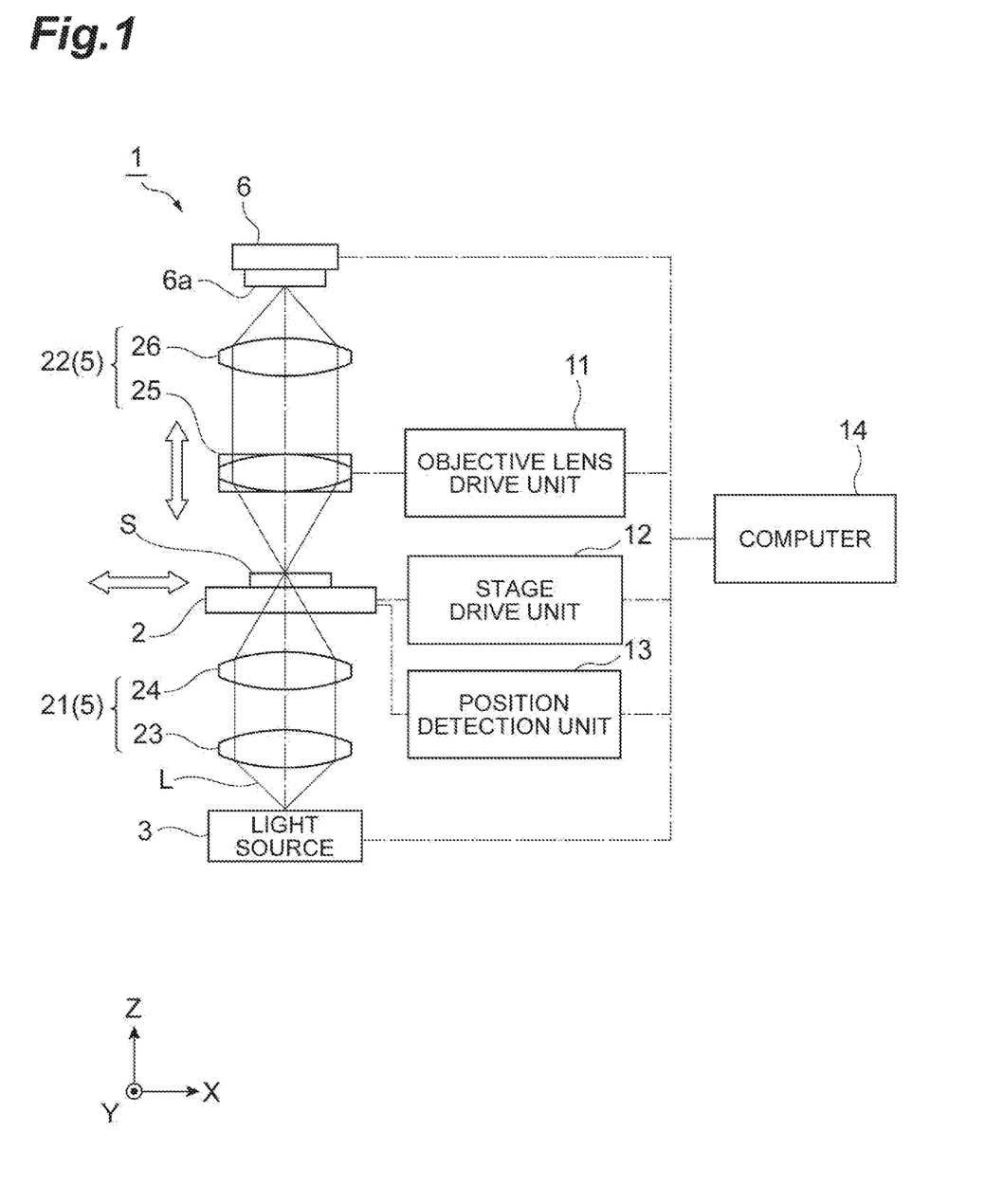
FIG. 1 is a view illustrating an embodiment of an image acquisition device.

FIG. 1 is a view illustrating an embodiment of an image acquisition device. As illustrated in the same drawing, the image acquisition device 1 includes a stage 2 that holds a sample S, a light source 3 (light emission unit) that emits the instantaneous light L toward the sample S, a light guide optical system 5 including an objective lens 25 disposed to face the sample S on the stage 2, and a two-dimensional image capturing element 6 that captures an optical image of the sample S which is guided by the light guide optical system 5.

In addition, the image acquisition device 1 includes an objective lens drive unit 11 that changes a focal point position of the objective lens 25 with respect to the sample S, a stage drive unit (drive unit) 12 that moves the sample S in a direction (scanning direction) intersecting an optical axis of the objective lens 25 at a predetermined speed, a position detection unit 13 that detects a position of the stage 2, and a computer 14 that collectively controls an operation of the image acquisition device 1.

For example, the sample S that is observed by the image acquisition device 1 is a biological sample such as a tissue cell, and is placed on the stage 2, for example, in a state of being sealed in slide glass. The light source 3 is disposed on a bottom surface side of the stage 2. As the light source 3, for example, a flash lamp type light source such as a laser diode (LD), a light-emitting diode (LED), a super luminescent diode (SLD), and a xenon flash lamp is used. An operation of the light source 3 is controlled by a light source control unit 101A to be described later.

The light guide optical system 5 includes an illumination optical system 21 that is disposed between the light source 3 and the stage 2, and a microscope optical system 22 that is disposed between the stage 2 and the two-dimensional image capturing element 6. For example, the illumination optical system 21 includes a Koehler illumination optical system constituted by a condensing lens 23 and a projection lens 24, and guides light from the light source 3 and irradiates the sample S with uniform light.

On the other hand, the microscope optical system 22 includes the objective lens 25, and an image forming lens 26 that is disposed on a subsequent-stage side (two-dimensional image capturing element 6 side) of the objective lens 25, and guides an optical image of the sample S to the two-dimensional image capturing element 6. Note that, the optical image of the sample S is an image by transmitted light in the case of bright visual field illumination, an image by scattered light in the case of dark visual field illumination, or an image by light-emitting (fluorescence) in the case of light-emitting observation (fluorescence observation). In addition, the optical image may be an image by reflected light from the sample S. In these cases, as the light guide optical system 5, it is possible to employ an optical system corresponding to image acquisition of a transmitted-light image, a scattered-light image, and a light-emitting (fluorescent) image of the sample S.

Figure 2:
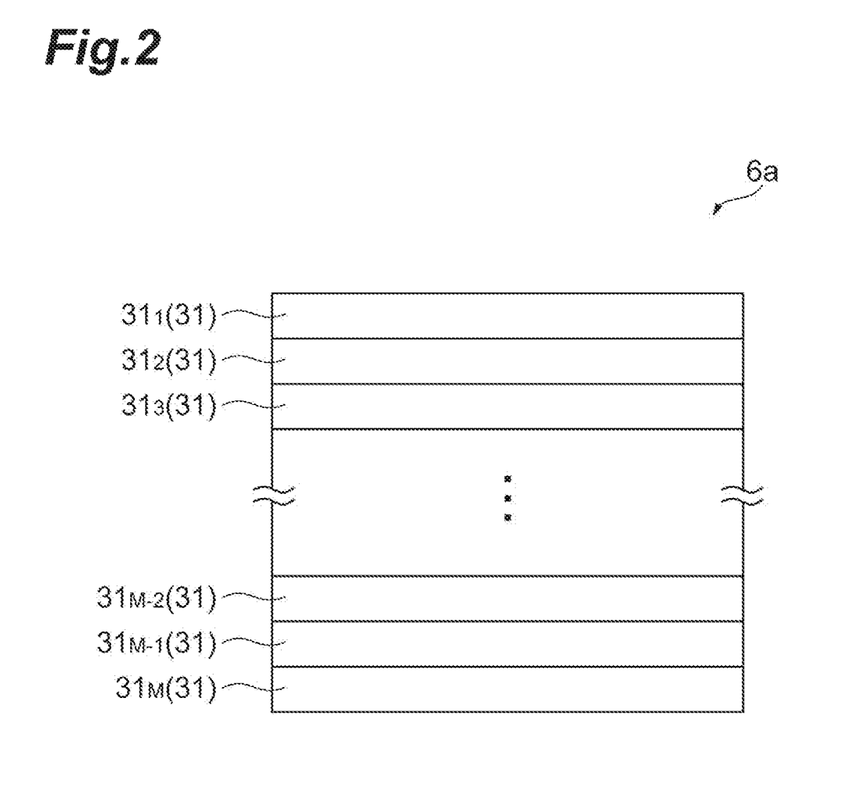
FIG. 2 is a view illustrating a light-receiving surface of an image capturing element that constitutes the image acquisition device.

The two-dimensional image capturing element 6 is an image capturing element including a plurality of pixel arrays. Examples of the two-dimensional image capturing element 6 include a CCD image sensor and a CMOS image sensor. As illustrated in FIG. 2, for example, M pixel arrays 31 (a first pixel array $31_1$, a second pixel array $31_2$, a third pixel array $31_3$, . . . , an M-$2^{th}$ pixel array $31_{M-2}$, an M-$1^{th}$ pixel array $31_{M-1}$, and an M$^{th}$ pixel array $31_M$) in which a plurality of pixels are one-dimensionally disposed are arranged on the light-receiving surface 6a of the two-dimensional image capturing element 6 to be parallel to each other. The two-dimensional image capturing element 6 sequentially captures the optical image of the sample S which is guided by the light guide optical system 5 at a predetermined frame rate on the basis of input of a trigger signal output from the computer 14, and outputs image data (tile image T to be described later) acquired through image capturing to the computer 14. Note that, the trigger signal may be output from the stage drive unit 12 or the position detection unit 13.

For example, the objective lens drive unit 11 is constituted by a motor such as a stepping motor (pulse motor) or an actuator such as a piezo actuator. The objective lens drive unit 11 drives the objective lens 25 in a Z direction along an optical axis of the objective lens 25 on the basis of control by an objective lens control unit 101B to be described later. According to this, the focal point position of the objective lens 25 with respect to the sample S is moved.

For example, the stage drive unit 12 is constituted by a motor such as a stepping motor (pulse motor) or an actuator such as a piezo actuator. The stage drive unit 12 drives the stage 2 in an XY direction with respect to a plane having a predetermined angle (for example, 90°) with respect to an orthogonal plane of the optical axis of the objective lens 25 on the basis of control by a stage control unit 101C to be described later. According to this, the sample S held by the stage 2 moves with respect to the optical axis of the objective lens, and a visual field position of the objective lens 25 with respect to the sample S moves.

In addition, for example, the position detection unit 13 is constituted by a linear encoder that is attached to the stage 2. The position detection unit 13 detects XY coordinates of the stage 2. The position detection unit 13 generates position information indicating a detection result, and outputs the detection result to the computer 14.

The computer 14 physically includes a memory such as a RAM and a ROM, a processor (operation circuit) such as a CPU, a communication interface, a storage unit such as a hard disk, and a display unit such as a display. Examples of the computer 14 include a personal computer, a microcomputer, a cloud server, a smart device (smart phone, tablet terminal, or the like), and the like.

Figure 3:
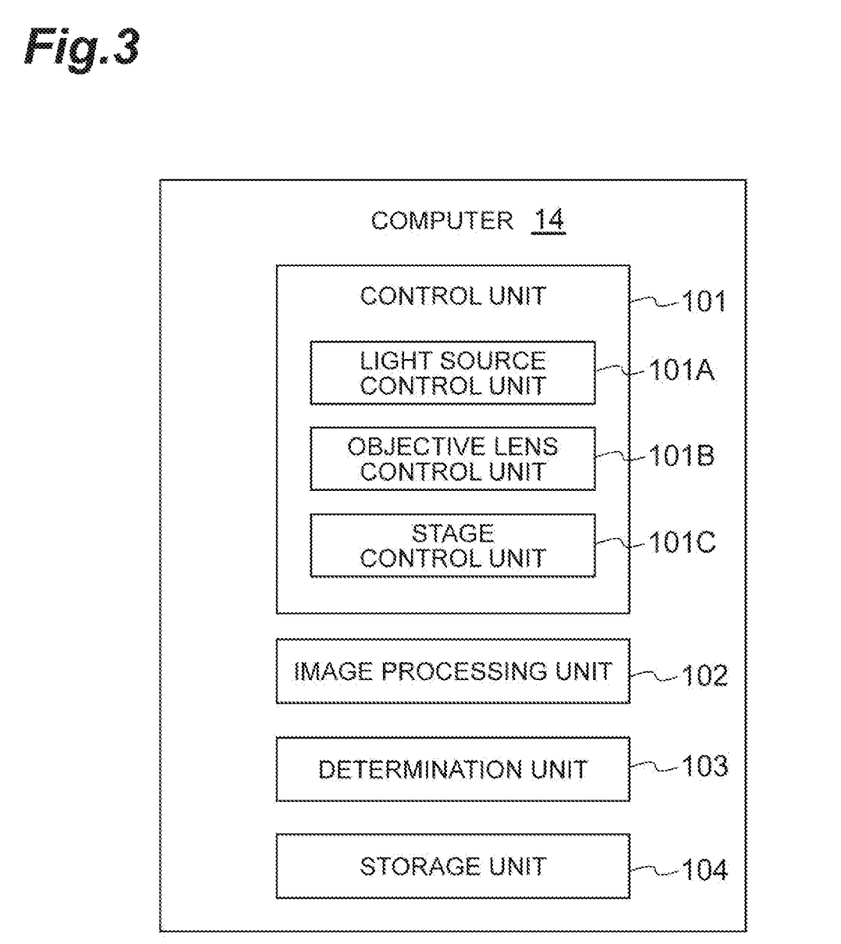
FIG. 3 is a block diagram illustrating functional constituent elements of a computer.

As illustrated in FIG. 3, the computer 14 functions as a control unit 101 that controls an operation of the image acquisition device 1, an image processing unit 102 that executes processing of image data captured by the two-dimensional image capturing element 6, and a determination unit 103 that determines a state of the image data captured by the two-dimensional image capturing element 6 by executing a program stored in the memory by the CPU of a computer system. In addition, the computer 14 includes a storage unit 104 that stores various pieces of information such as the image data. Note that, the computer 14 may be constituted by a plurality of computers, and for example, a function of the control unit 101 may be executed by one computer and another function may be executed by a different computer.

More specifically, the control unit 101 includes the light source control unit 101A that controls the operation of the light source 3, the objective lens control unit 101B that controls the operation of the objective lens drive unit 11, and the stage control unit 101C that controls the operation of the stage drive unit 12. The control unit 101 controls execution of the lane scanning by the light source 3, the stage drive unit 12, and the two-dimensional image capturing element 6 by the light source control unit 101A, the objective lens control unit 101B, and the stage control unit 101C. Hereinafter, description will be given of the lane scanning.

In the image acquisition device 1, for example, image capturing with respect to the sample S is performed at a high magnification such as 20 times or 40 times. According to this, the visual field of the objective lens 25 becomes smaller than the sample S, and a region capable of acquiring an image by image capturing performed once also becomes smaller than the sample S. Accordingly, it is necessary to move the visual field of the objective lens 25 with respect to the sample S for image capturing of the entirety of the sample S. Here, in the image acquisition device 1, an image acquisition region is set to include the sample S with respect to the slide glass that holds the sample S, and the lane scanning with respect to the image acquisition region is executed.

Figure 4:
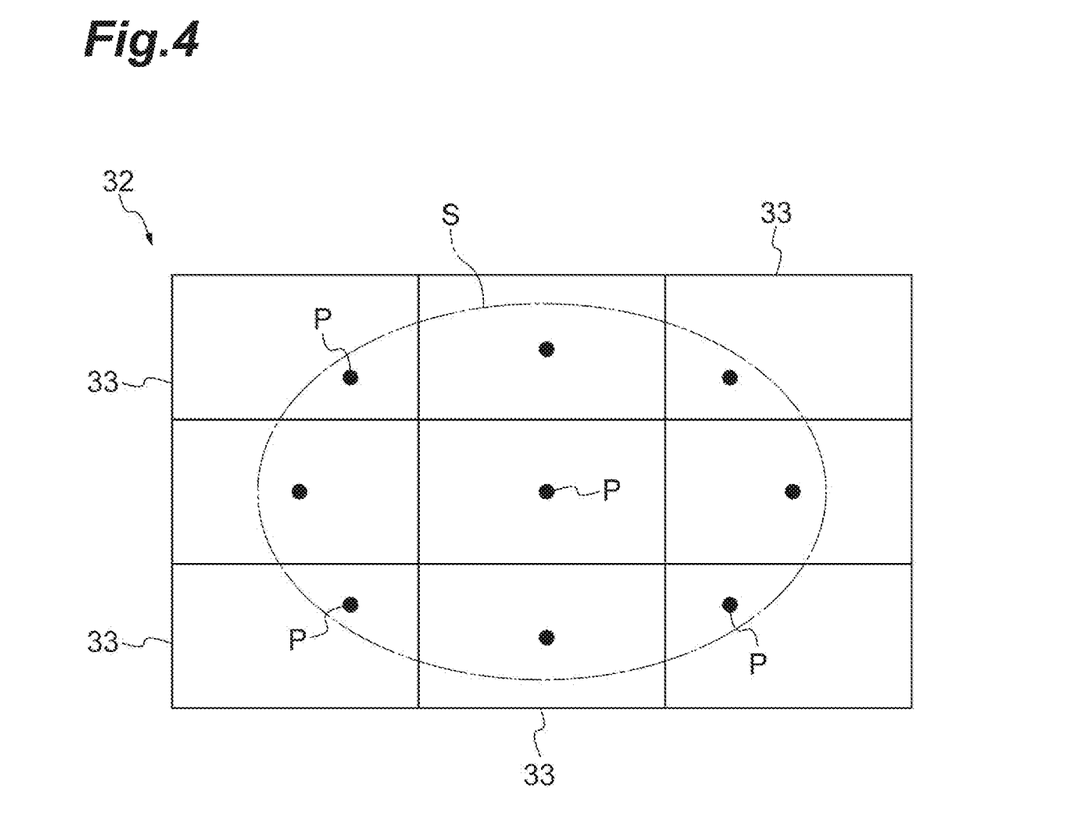
FIG. 4 is a view illustrating an example of a macro image with respect to a sample.

In the lane scanning according to this embodiment, as illustrated in FIG. 4, as pre-setting, a macro image of the entirety of the slide glass is acquired in advance by a macro image acquisition device (not illustrated), and an image acquisition region 32 with respect to the sample S is set on the basis of the acquired macro image. When setting the image acquisition region 32, it is preferable to perform binarization of the macro image to easily specify a range of the sample S in the macro image. After setting the image acquisition region 32, a focal point measurement position in the image acquisition region 32 is set to create a focus map.

In the example illustrated in FIG. 4, the image acquisition region 32 is divided into nine parts in a matrix shape, and a focal point measurement position P is set to the center of each of the divided regions 33. In addition, in a case where the center of the divided region 33 deviates from the sample S, the focal point measurement position P is set to an arbitrary position at which the sample S is located through manual setting by a user, or the like. Next, the slide glass is set to the image acquisition device 1 that is a micro image acquisition device, and the stage 2 is moved so that the objective lens 25 is located on the focal point measurement position P. In addition, a plurality of two-dimensional images in the divided region 33 are acquired while driving the objective lens 25 in the Z direction at the focal point measurement position P, and a focused position is determined on the basis of contrast of the acquired two-dimensional images. A focus map of the sample S is created by applying a least squares method to the focused position determined at each focal point measurement position P.

After creating the focus map, an image capturing position in the image acquisition region 32 is set. A visual field F of the objective lens 25 on the sample S is determined in advance by a magnification of the objective lens 25 that is used, or the like. According to this, a plurality of image capturing positions 34 are set in the image acquisition region 32 in a matrix shape by allocating a size of the visual field F with respect to the set image acquisition region 32. In the example illustrated in FIG. 5, a plurality of first to $n^{th}$ lanes are set in the image acquisition region 32 in a Y direction, and a plurality of first to $m^{th}$ image capturing positions 34 are set to each of the lanes in the X direction (scanning direction). XY coordinates of each of the image capturing positions 34, and a Z coordinate of the image capturing position 34 which is obtained from the focus map are stored in the storage unit 104 in combination with the number of the image capturing positions 34 in each of the lanes.

In the lane scanning, a part of the sample S is subjected to stroboscopic photographing with the instantaneous light L while moving the stage 2 in the XY direction. In a case where the stage 2 is constructed in combination of an X stage and a Y stage, it is considered that an X-axis and a Y-axis of the stage 2 do not intersect completely, and Y coordinates of the image capturing positions 34 in each of the lanes do not match each other. Accordingly, when setting the image capturing positions 34, it is preferable to include the Y coordinates of the image capturing positions 34, as described above. In a case where a deviation from the orthogonality between the X-axis and the Y-axis of the stage 2 is as small as negligible, only XZ coordinates of the image capturing positions 34 may be stored in the storage unit 104 for simplification of processing.

The image acquisition device 1 captures images of parts of the sample S which correspond to the image capturing positions 34 by the two-dimensional image capturing element 6 to acquire tile images T which respectively correspond to the image capturing positions 34. After the visual field F of the objective lens 25 moves to the image capturing position 34 at which the subsequent image capturing is performed, image capturing is performed again to acquire the subsequent tile image T. Then, the image acquisition device 1 repetitively executes an operation of sequentially capturing images of the image capturing positions 34 for every lane, and thus acquisition of image data including a plurality of tile image rows R is performed.

Figure 5:
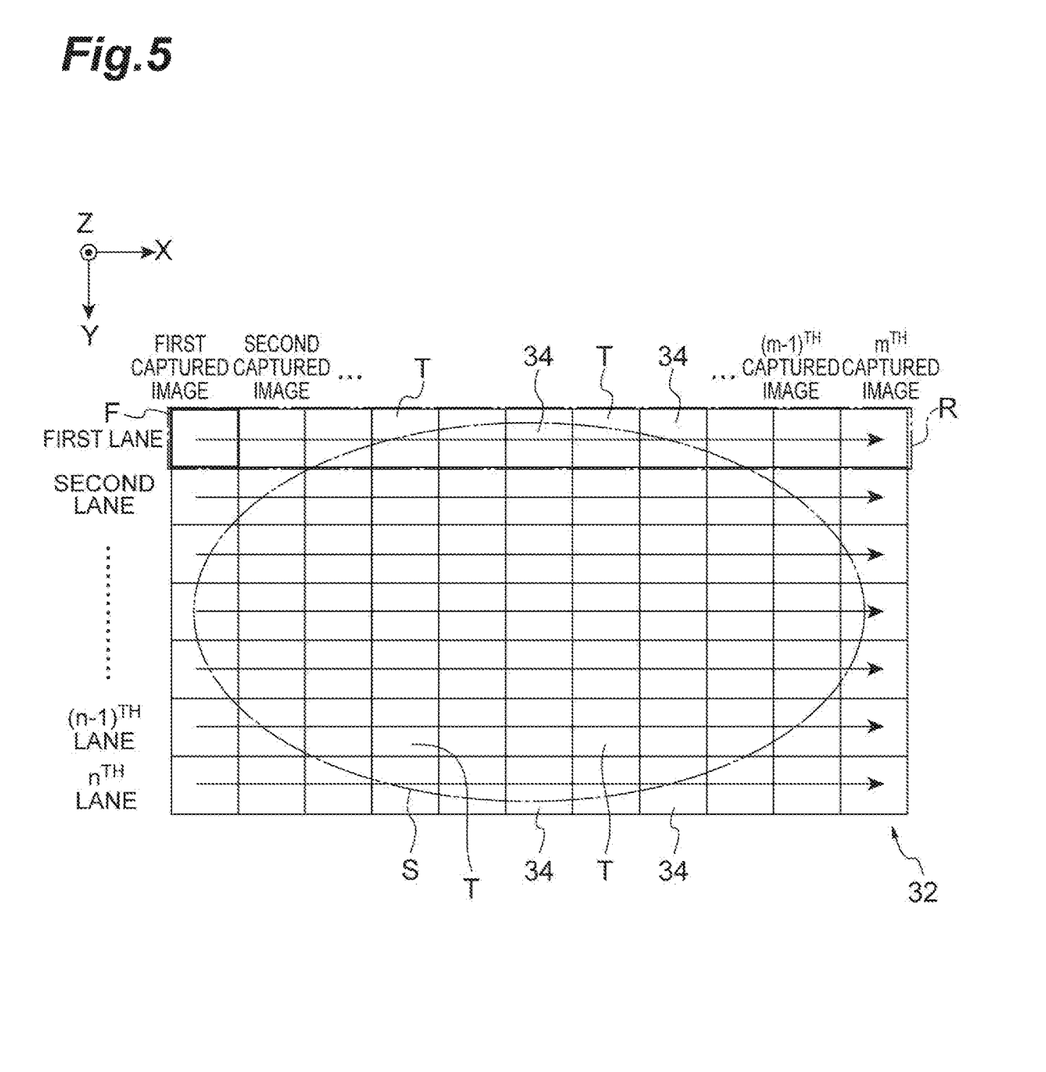
FIG. 5 is a view illustrating an example of an image acquisition region with respect to the sample.
Figure 6:
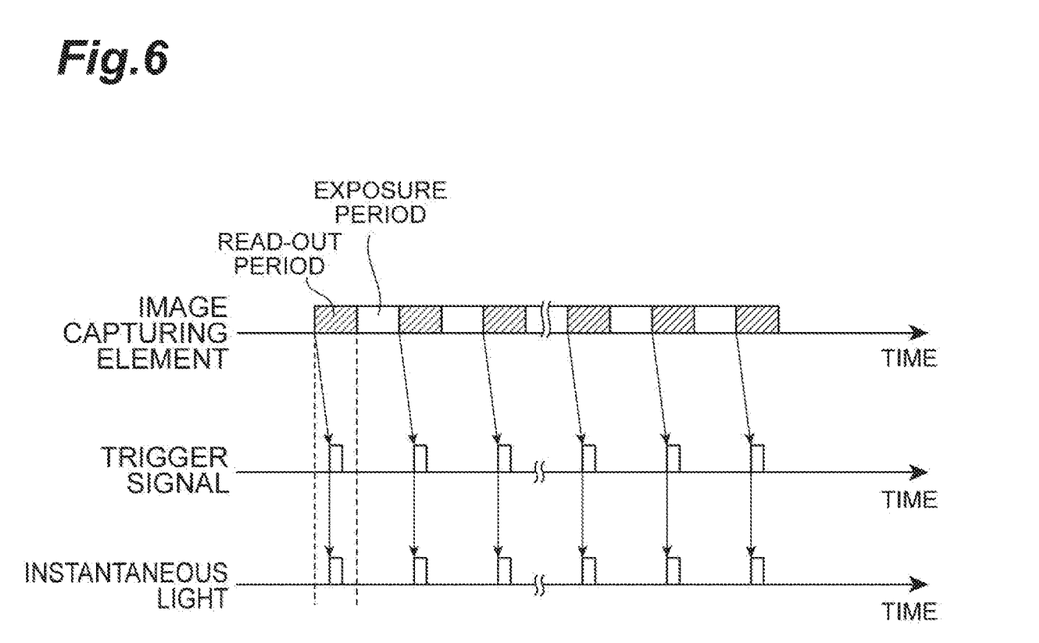
FIG. 6 is a view illustrating an example of a relationship between an exposure period and a read-out period, and irradiation of instantaneous light in the image capturing element.

As a method of moving the visual field position of the objective lens 25 by the stage control unit 101C, for example, as illustrated in FIG. 5, a uni-directional scanning in which scanning directions in respective lanes become the same direction is employed. As the method of moving the visual field position of the objective lens 25, bi-directional scanning in which scanning directions between adjacent lanes are inverted may be employed without limitation to the uni-directional scanning. In addition, the light source control unit 101A causes the light source 3 to emit the instantaneous light L. In this embodiment, as illustrated in FIG. 6, the two-dimensional image capturing element 6 alternately executes exposure and read-out, and a trigger signal is output to the light source control unit 101A during an exposure period of the pixel arrays 31 (the first pixel array $31_1$, the second pixel array $31_2$, the third pixel array $31_3$, . . . , the $M^{th}$ pixel array $31_M$). The light source control unit 101A causes the light source 3 to emit the instantaneous light L on the basis of the trigger signal.

A read-out method of the two-dimensional image capturing element 6 may be a global shutter method in which exposure periods of the pixel arrays 31 match each other, or a rolling shutter method in which the exposure periods of the pixel arrays 31 deviate from each other by a predetermined time. For example, the trigger signal is output from the control unit 101 to the two-dimensional image capturing element 6 and the light source control unit 101A when the visual field F of the objective lens 25 moves to the image capturing position 34 that becomes an image capturing target by driving of the stage 2 on the basis of position information of the stage 2 which is detected by the position detection unit 13. In addition, the number of clocks for controlling the stage drive unit 12 is counted by the control unit 101, and when reaching a predetermined number of counts, a trigger signal may be output from the control unit 101 to the two-dimensional image capturing element 6 and the light source control unit 101A. Note that, in the case of combining the instantaneous light L and the rolling shutter method, it is necessary to output the instantaneous light L when all of the pixel arrays 31 are exposed. Accordingly, the trigger signal may be output to the light source control unit 101A so that the instantaneous light L is output when the visual field F of the objective lens 25 moves to the image capturing position 34 that becomes an image capturing target by driving of the stage 2.

The image processing unit 102 executes processing of image data output from the two-dimensional image capturing element 6. The image processing unit 102 receives the tile images T output from the two-dimensional image capturing element 6, and combines the tile image rows R acquired in the respective lanes to generate observation image data of the entirety of the sample S. When generating the observation image data, for example, parts of adjacent tile images T and T may be superimposed on each other on the basis of the position information output from the position detection unit 13.

The determination unit 103 counts the number of the tile images T included in the tile image row R acquired in one lane, and determines whether or not the number of images reaches a planned acquisition count that is set in advance. In the example illustrated in FIG. 5, the number of the image capturing positions 34 in each lane is set to m, and the tile image row R is constituted by m pieces of tile images T. Accordingly, the determination unit 103 refers to the storage unit 104, and in a case where the number of the tile images T included in the tile image row R acquired in one lane is m, the determination unit 103 determines that the number of the tile images T reaches the planned acquisition count that is set in advance, and in a case where the number of the tile images T is less than m, the determination unit 103 determines that the number of the tile images T does not reach the planned acquisition count that is set in advance. The determination unit 103 may count the number of the tile images T included in a corresponding tile image row R whenever image capturing in one lane is completed, or may count the number of the tile images included in each of the tile image rows R after completing image capturing in all lanes.

In a case where it is determined that the number of images of the tile image row R in one lane does not reach the planned acquisition count that is set in advance, the determination unit 103 output instruction information that gives an instruction for re-execution of the lane scanning with respect to the lane to the control unit 101. The control unit 101 that receives the instruction information re-executes the lane scanning by the light source 3, the stage drive unit 12, and the two-dimensional image capturing element 6 with respect to the lane for which it is determined that the number of the tile images T does not reach the planned acquisition count that is set in advance. The control unit 101 may set a speed $V_1$ of the stage 2 when re-executing the lane scanning to a speed slower than a speed $V_0$ in a first lane scanning. For example, the control unit 101 sets the speed $V_1$ of the stage 2 when re-executing the lane scanning to a speed that is ⅔ or less times the speed $V_0$ of the first lane scanning.

Next, description will be given of an image acquisition method using the image acquisition device 1.

Figure 7:
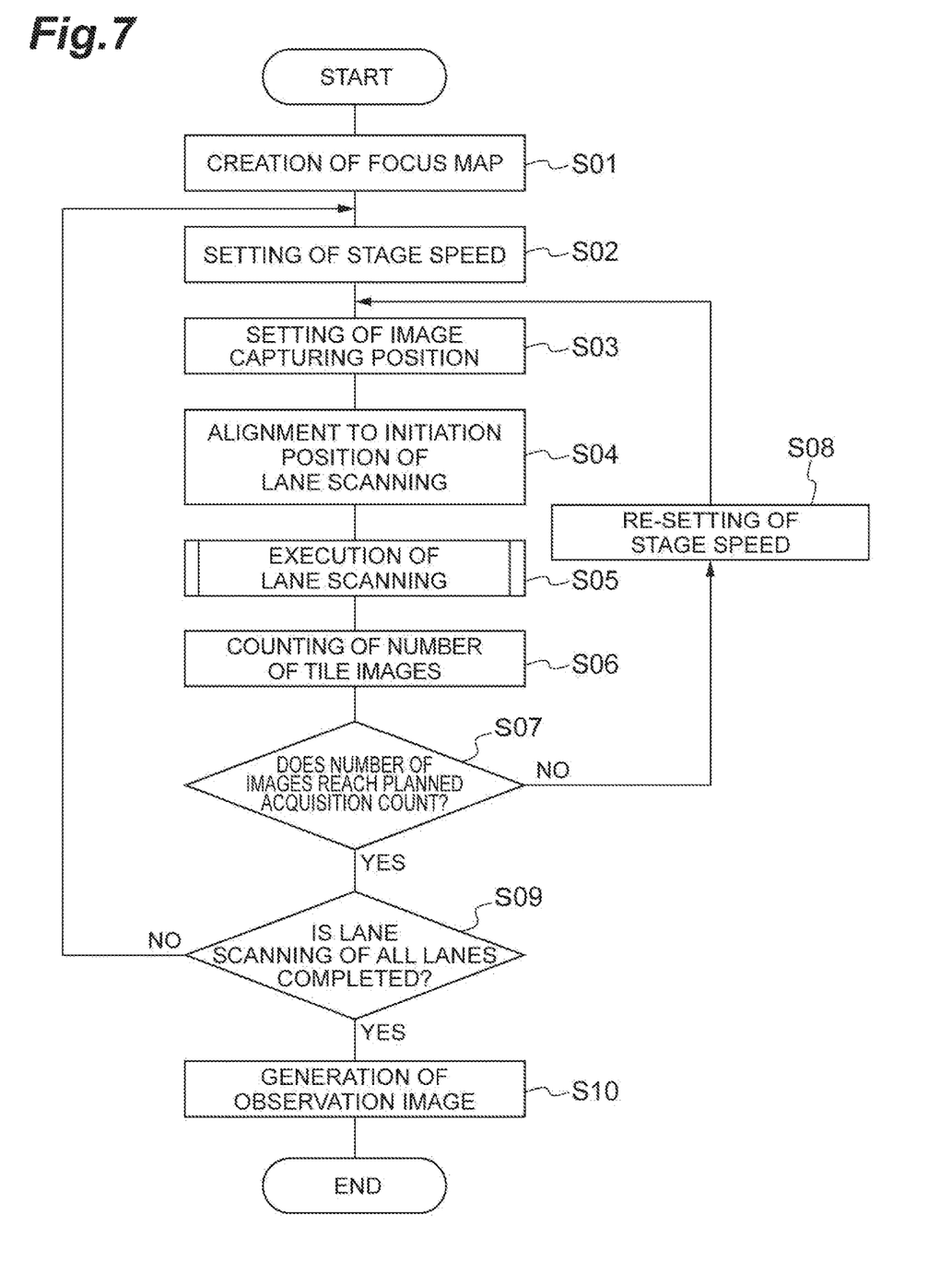
FIG. 7 is a flowchart illustrating an example of an image acquisition method.

FIG. 7 is a flowchart illustrating an example of the image acquisition method using the image acquisition device 1. As illustrated in the same drawing, in the image acquisition method, as a pre-setting, first, a focus map is created (step S01). Here, a macro image of the entirety of the slide glass is acquired in advance by a macro image acquisition device (not illustrated), and the image acquisition region 32 with respect to the sample S is set on the basis of the acquired macro image. After setting the image acquisition region 32, a focal point measurement position in the image acquisition region 32 is set, and a focused position is determined on the basis of contrast of a two-dimensional image obtained at each focal point measurement position P. In addition, the focus map of the sample S is created by applying a least squares method to the focused position determined at each focal point measurement position P.

After creating the focus map, the speed $V_0$ of the stage 2 when executing the lane scanning is set (step S02). In addition, the image capturing position 34 in the image acquisition region 32 is set on the basis of the created macro image (step S03). That is, in the image acquisition region 32, a plurality of first to $n^{th}$ lanes are set in the Y direction, and a plurality of first to $m^{th}$ image capturing positions 34 are set to each of the lanes in the X direction. In addition, XY coordinates of each of the image capturing positions 34, and a Z coordinate of the image capturing position 34 which is obtained from the focus map are stored in the storage unit 104 in combination with the number of the image capturing positions 34 in each of the lanes.

Figure 8:
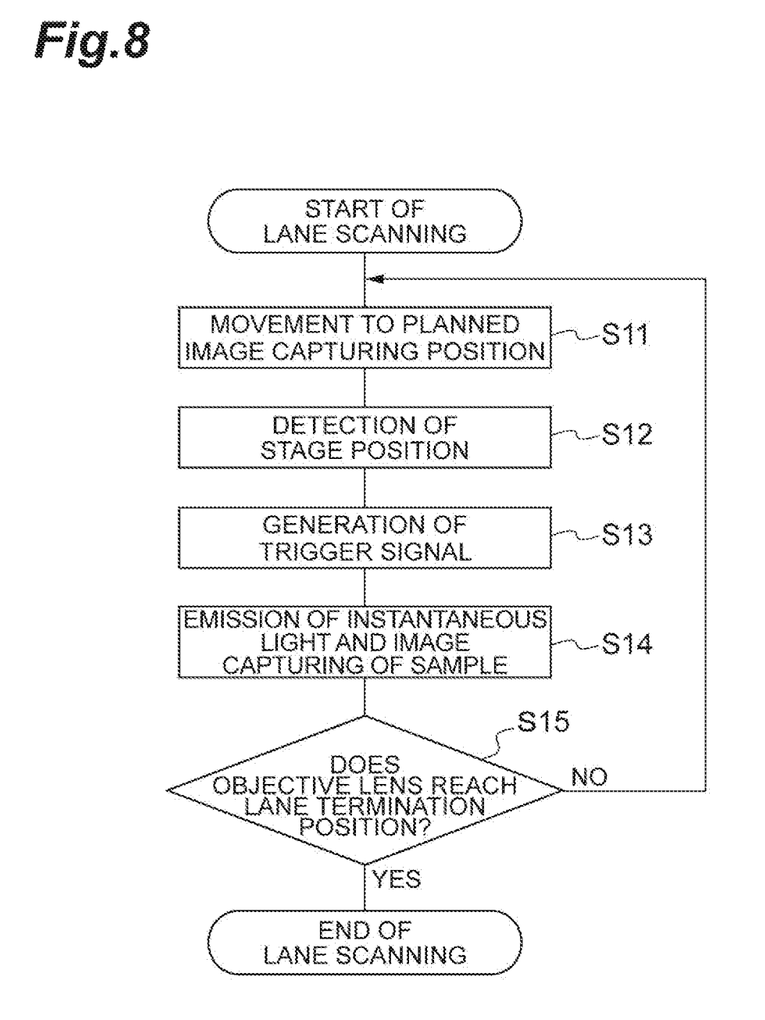
FIG. 8 is a flowchart illustrating an example of lane scanning.

After setting the image capturing positions 34, coordinates of all of the image capturing positions 34 are read out from the storage unit 104, and alignment of the stage 2 with respect to the objective lens 25 is performed so that the visual field position of the objective lens 25 is located at an initiation position of the lane scanning (step S04: alignment step). At this time, the objective lens drive unit 11 is controlled so that the height of the objective lens 25 with respect to the stage 2 is also located at the initiation position. In addition, the lane scanning with respect to one lane is executed (step S05). In the lane scanning, as illustrated in FIG. 8, first, the visual field position of the objective lens 25 is moved to the image capturing position 34 by driving of the stage 2 (step S11). At this time, a position of the stage 2 is detected by the position detection unit 13 (step S12: position detection step).

A trigger signal is generated at timing at which the visual field position of the objective lens 25 reaches the image capturing position 34 on the basis of a detection result of the position of the stage 2 (step S13), and irradiation of the instantaneous light L and image capturing of the sample S are performed (step S14: image capturing step). In the image capturing step, an optical image of the sample S is captured by the two-dimensional image capturing element 6 in synchronization with irradiation of the instantaneous light L while moving the stage 2 in the scanning direction of the lane scanning at the speed $V_0$, and the tile images T at the image capturing positions 34 are acquired. In addition, in the image capturing step, image capturing by the two-dimensional image capturing element 6 and emission of the instantaneous light L are synchronized on the basis of the position information of the stage 2 which is generated in the position detection step.

After executing image capturing at one image capturing position 34, it is determined whether or not the visual field position of the objective lens 25 reaches a lane termination position (step S15). In a case where it is determined that the visual field position of the objective lens 25 does not reach the lane termination position, the processes from step S11 to step S15 are repetitively executed with respect to subsequent image capturing positions 34, and the tile image row R at the image capturing positions 34 included in the lane is acquired. In a case where it is determined that the visual field position of the objective lens 25 reaches the lane termination position, the process with respect to the lane is completed.

After completion of the lane scanning with respect to one lane, as illustrated in FIG. 7, the number of the tile images T included in the tile image row R acquired in one lane is counted (step S06), and it is determined whether or not the number of images reaches a planned acquisition count that is set in advance (step S07: determination step). In the determination step, in a case where it is determined that the number of images does not reach the planned acquisition count that is set in advance, the lane scanning with respect to the lane is re-executed (re-execution step). In the re-execution step, after the speed of the stage 2 is re-set to the speed $V_1$ slower than the speed $V_0$ that is set in step S02 (step S08), the processes in step S03 to step S07 are re-executed.

On the other hand, in the determination step, in a case where it is determined that the number of images reaches the planned acquisition count that is set in advance, it is determined whether or not the lane scanning is completed in all lanes (step S09). In a case where it is determined that the lane scanning is not completed, the processes from step S02 to step S09 are repetitively executed with respect to the subsequent lane. In a case where the lane scanning is re-executed with respect to the immediately previous lane, in the process in step S02 with respect to the subsequent lane, the speed of the stage 2 is re-set to the speed $V_0$. In a case where it is determined that the lane scanning is completed, tile image rows R acquired in lane scanning of respective lanes are composed to generate observation image data of the entirety of the sample S (step S10).

Figure 9:
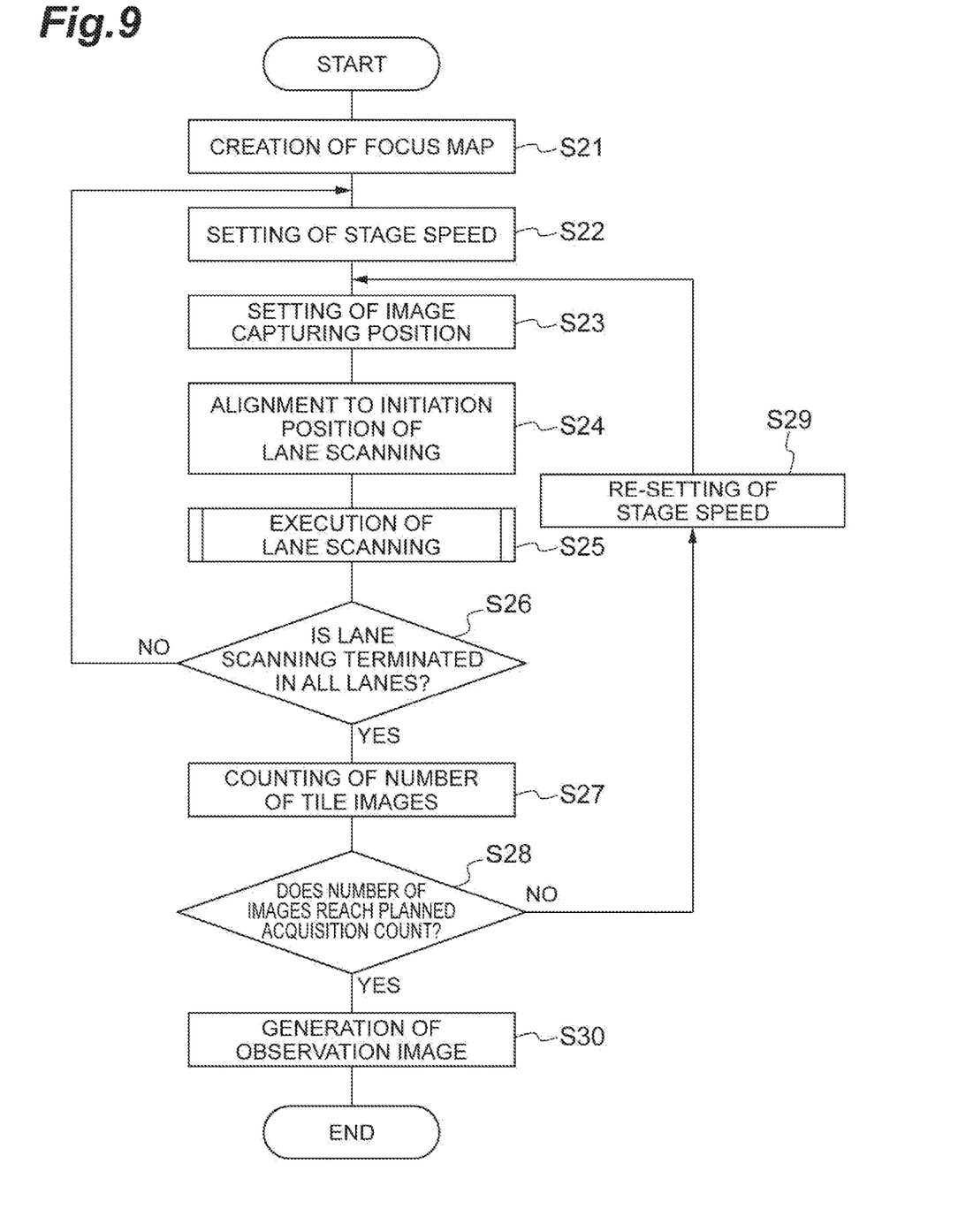
FIG. 9 is a flowchart illustrating another example of the image acquisition method.

In the example illustrated in FIG. 7, the number of the tile images T included in a corresponding tile image row R is counted whenever image capturing in one lane is completed, but as illustrated in FIG. 9, the number of the tile images T included in respective tile image rows R may be counted after completing image capturing of all lanes. In the example illustrated in FIG. 9, as in step S01 to step S05 in FIG. 7, respective processes of creation of the focus map (step S21), setting of the stage speed (step S22), setting of the image capturing position (step S23), alignment of the objective lens 25 to the initiation position of the lane scanning (step S24), and execution of the lane scanning (step S25) are performed.

After executing the lane scanning, it is determined whether or not the lane scanning is completed in all lanes (step S26). In a case where it is determined that the lane scanning in all lanes is not completed, the processes from step S22 to step S26 are repetitively executed with respect to the subsequent lane. In a case where it is determined that the lane scanning in all lanes is completed, the number of the tile images T included in the tile image rows R acquired in the respective lanes is counted (step S27), and it is determined whether or not the number of images reaches the planned acquisition count that is set in advance (step S28: determination step).

In the determination step, in a case where it is determined that the number of images does not reaches the planned acquisition count that is set in advance, the lane scanning with respect to the lane is re-executed (re-execution step). In the re-execution step, after the speed of the stage 2 is re-set to the speed $V_1$ slower than the speed $V_0$ that is set in step S22 (step S29), the processes in step S23 to step S28 are re-executed. In the determination step, in a case where it is determined that the number of images reaches the planned acquisition count that is set in advance, the tile image rows R acquired in the lane scanning of respective lanes are composed to generate the observation image data of the entirety of the sample S (step S30).

As described above, in the image acquisition device 1, when capturing the optical image of the sample S through the lane scanning, the number of the tile images T included in the tile image row R acquired in one lane is counted, a determination is made as to whether or not the number of images reaches the planned acquisition count that is set in advance. In addition, in a case where it is determined that the number of images does not reach the planned acquisition count, the lane scanning with respect to the lane is re-executed. Accordingly, even when a loss of the tile images T occurs due to an environment load, the tile images T are complemented by re-execution of the lane scanning, and thus it is possible to prevent the loss of the tile images T in an observation image.

In addition, in the image acquisition device 1, when re-executing the lane scanning, the control unit 101 sets a movement speed of the stage 2 to a speed slower than a predetermined speed. According to this, it is possible to suppress occurrence of the loss of the tile images T when re-executing the lane scanning.

In addition, in the image acquisition device 1, a position of the stage 2 is detected by the position detection unit 13, and the control unit 101 synchronizes image capturing by the two-dimensional image capturing element 6 and emission of the instantaneous light L by the light source 3 on the basis of position information of the stage 2 which is generated by the position detection unit 13. According to this, it is possible to appropriately execute acquisition of the tile images T at a target position of the sample S.

In addition, in the image acquisition device 1, the determination unit 103 may count the number of the tile images T included in the tile image row R whenever image capturing in one lane is completed. In this case, necessity and non-necessity of complementation of the tile images T are determined at the time of acquiring each tile image row R, and thus it is possible to obtain an observation image without the loss of the tile images T simultaneously with completion of the lane scanning.

In addition, in the image acquisition device 1, the determination unit 103 may count the number of the tile images T included in respective tile image rows R after completing image capturing in all lanes. In this case, necessity and non-necessity of complementation of the tile images T are determined after acquisition of all tile image rows R, and thus in a case where the loss of the tile images T does not occur, it is possible to shorten time taken until obtaining the observation image.

REFERENCE SIGNS LIST

1: image acquisition device, 2: stage, 3: light source (light emission unit), 5: light guide optical system, 6: two-dimensional image capturing element, 12: stage drive unit (drive unit), 13: position detection unit, 25: objective lens, 101: control unit, 103: determination unit, L: instantaneous light, R: tile image row, T: tile image, S: sample.

The invention claimed is:

1. A device comprising:
a stage configured to hold a sample;
a light emission unit configured to emit instantaneous light;
a light guide optical system configured to include an objective lens disposed to face the sample on the stage;
a driver configured to move the sample in a scanning direction intersecting an optical axis of the objective lens at a predetermined speed;
a two-dimensional image capturing element configured to capture optical image of the sample, which is guided by the light guide optical system, through lane scanning in cooperation with the light emission unit and the driver, and acquires observation image data constituted by a plurality of tile image rows;
a controller configured to control execution of the lane scanning by the light emission unit, the driver, and the two-dimensional image capturing element; and
a determination unit configured to count the number of tile images included in each of the tile image rows which is acquired in one lane, and determines whether or not the number of images reaches a planned acquisition count that is set in advance,
wherein in a case where the determination unit determines that the number of images does not reach the planned acquisition count, the controller re-executes the lane scanning with respect to the one lane.

2. The device according to claim 1,
wherein when re-executing the lane scanning, the controller sets a movement speed of the stage to a speed slower than the predetermined speed.

3. The device according to claim 1, further comprising:
a position detector configured to detect a position of the stage,
wherein the controller synchronizes image capturing by the two-dimensional image capturing element and emission of the instantaneous light by the light emission unit on the basis of position information of the stage which is generated by the position detector.

4. The device according to claim 1,
wherein the determination unit counts the number of the tile images included in the tile image row whenever image capturing in the one lane is completed.

5. The device according to claim 1,
wherein the determination unit counts the number of the tile images included in each of the tile image rows after completing image capturing in all lanes.

6. An method comprising:
aligning a stage configured to hold a sample with respect to an objective lens so that a visual field position of the objective lens is located at an initiation position of lane scanning;
capturing an optical image of the sample by a two-dimensional image capturing element in synchronization with irradiation of instantaneous light while moving the stage in a scanning direction of the lane scanning at a predetermined speed, and acquiring observation image data constituted by a plurality of tile image rows;
counting the number of tile images included in each of the tile image rows which is acquired in one lane, and determining whether or not the number of images reaches a planned acquisition count that is set in advance; and re-executing lane scanning with respect to the one lane in a case where it is determined that the number of images does not reach the planned acquisition count.

7. The method according to claim 6, wherein, a movement speed of the stage is set to a speed slower than the predetermined speed in the re-execution step.

8. The method according to claim 6, further comprising:

detecting a position of the stage, wherein image capturing by the two-dimensional image capturing element and emission of the instantaneous light are synchronized on the basis of position information of the stage.

9. The method according to claim 6, wherein, the number of the tile images included in the tile image row is counted whenever image capturing in the one lane is completed.

10. The method according to claim 6, wherein, the number of the tile images included in each of the tile image rows is counted after completing image capturing in all lanes.

* * * * *